Jan. 3, 1967    W. W. STEWART ETAL    3,295,295
THERMOPLASTIC FILM PACKAGING APPARATUS
Filed Oct. 1, 1963    2 Sheets-Sheet 1
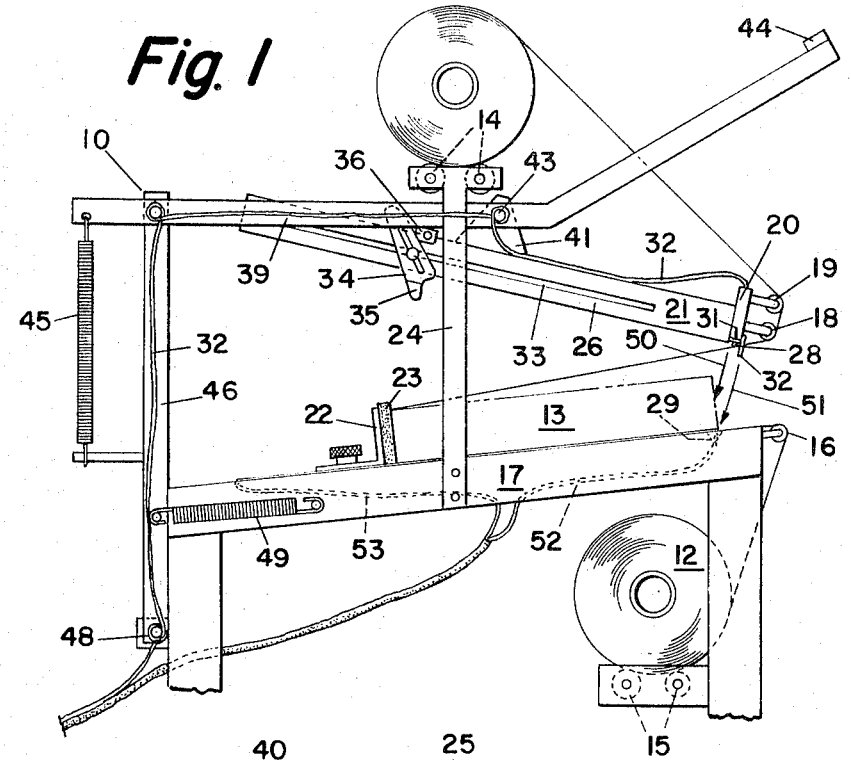
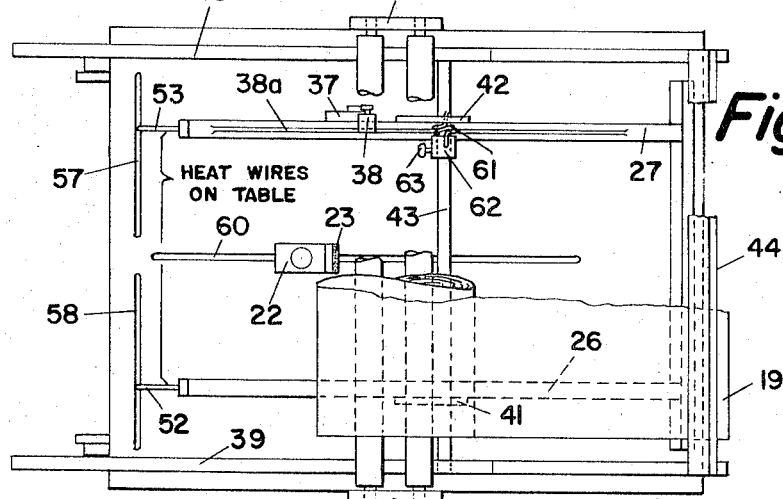
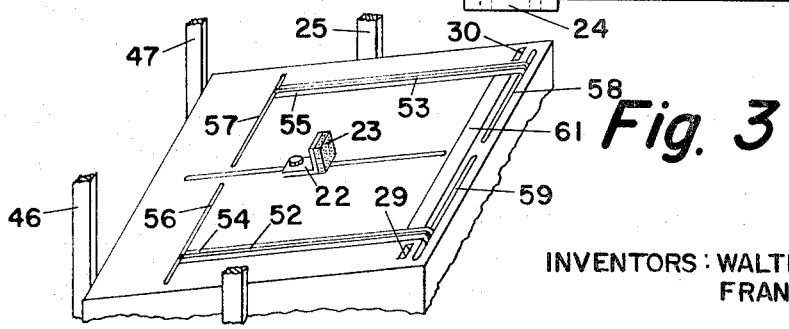
INVENTORS: WALTER W. STEWART
FRANK E. TIMMONS

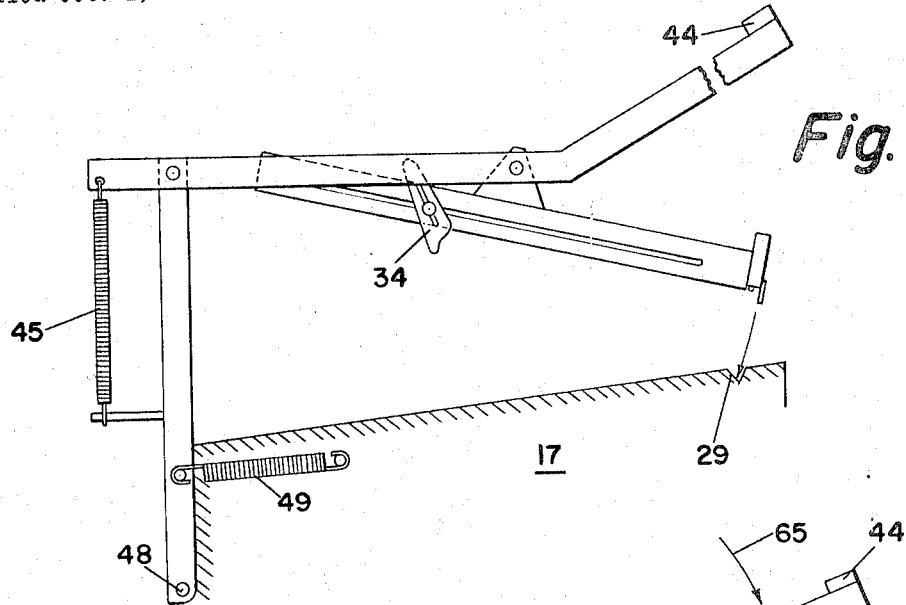
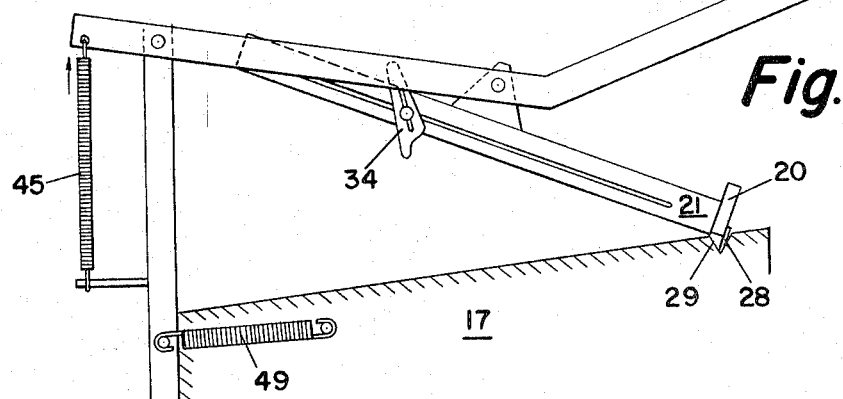
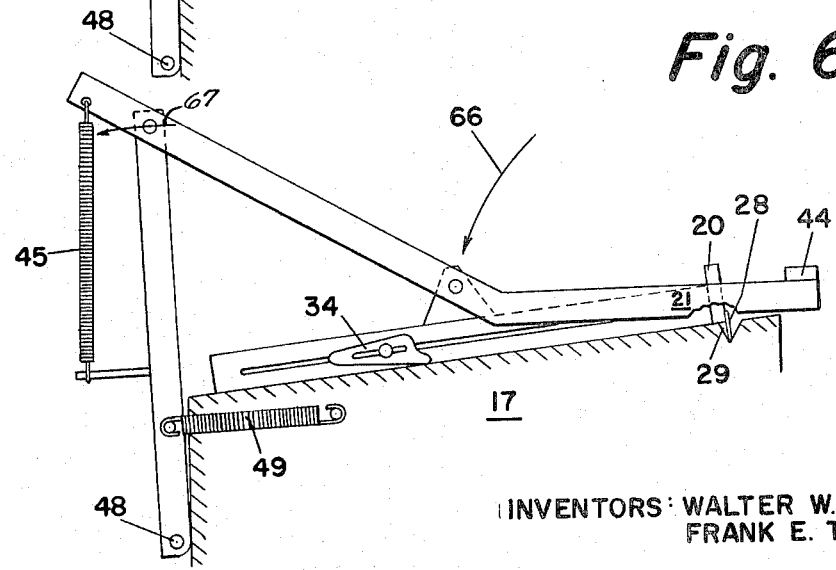

United States Patent Office 3,295,295
Patented Jan. 3, 1967

3,295,295
THERMOPLASTIC FILM PACKAGING
APPARATUS
Walter William Stewart, Thornton, Pa., and Frank Edward Timmons, Deerfield Beach, Fla. (both of 19 Stone Ridge Road, Thornton, Pa. 19373)
Filed Oct. 1, 1963, Ser. No. 312,992
6 Claims. (Cl. 53—390)

This invention relates to a thermoplastic film packaging apparatus. The packaging apparatus of this invention is designed so that it tightly wraps and heat seals a thermoplastic film about an article to be packaged, and the relatively tight wrap provided by this machine is particularly useful when packaging articles having a rectangular shape.

In the thermoplastic film packaging art, obtaining a good tight enclosure of the thermoplastic film about the article to be packaged without damaging the article has long been a problem. At one time it was considered that this problem had been overcome by using heat shrinkable thermoplastic films, i.e., thermoplastic films which have been uniaxially or biaxially oriented. Such films can be loosely wrapped around objects to be packaged and then subjected to heat which causes the thermoplastic film to shrink about the object, forming a tight fitting enclosure. Unfortunately, it is very difficult to control the degree of heat shrinkage which often results in loose packaging or excessively tight packaging causing the container about which the thermoplastic film is wrapped to be bent, folded or warped. In addition, the heat shrinking of thermoplastic film often adversely affects the tensile strength, stiffness, clarity, gloss, elongation, impact strength, tear strength, permeability and other properties of the film.

Much of the thermoplastic film packaging is currently accomplished using a manually operated L-sealer having thermal impulse wires which sever and seal the thermoplastic film. A disadvantage associated with using L-sealer equipment is that the thermoplastic film which is used must be centerfolded so that the fold serves as the equivalent of one sealed edge of the finished package. The centerfolding of the film usually results in increasing the cost of the film.

The thermoplastic film packaging apparatus of this invention accomplishes a relatively tight wrap of thermoplastic film with minimal slack about an article to be wrapped and heat sealed within the film by means of a uniquely movable heat sealing and pressure means. The uniquely movable heat sealing and pressure means is moved through a dual arcing downward path whereby it is able to tightly engage the thermoplastic film about the article to be wrapped. Another feature of this invention is that the movable heat sealing and pressure means may be U-shaped which enables the use of thermoplastic film which is not centerfolded.

It is an object of this invention to provide a thermoplastic film packaging apparatus having a uniquely movable heat sealing and pressure means which can wrap and heat seal thermoplastic film about an article with minimal slack.

Another object of the invention is to provide a thermoplastic film packaging apparatus which is particularly adapted to wrapping and heat sealing thermolastic film about rectangular shaped containers or articles of various sizes.

A further object of the invention is to provide a thermoplastic film packaging apparatus which does not require centerfolded thermoplastic film.

A still further object of the invention is to provide a thermoplastic film packaging apparatus which will tightly wrap and heat seal an article in a thermoplastic film with minimal heat shrinking treatment of the thermoplastic film.

Other objects and advantages of this invention will be apparent to those skilled in the art in view of the following description and in particular by reference to the drawings in which:

FIGURE 1 is a side elevation view of a thermoplastic film packaging apparatus made in accordance with this invention, including rolls of thermoplastic film and an article to be wrapped;

FIGURE 2 is a top plan view of the apparatus illustrated in FIGURE 1 omitting the article to be wrapped and with a portion of the thermoplastic film broken away to reveal the apparatus in greater detail;

FIGURE 3 is a perspective view of the work table illustrating the article holder, the adjustable heating elements and the anchor sockets;

FIGURE 4 is a schematic diagram illustrating the uniquely movable heat sealing and pressure means in the completely open position;

FIGURE 5 is a schematic diagram illustrating the uniquely movable heat sealing and pressure means as it is being closed and has just made contact with the work table; and FIGURE 6 is a schematic diagram illustrating the uniquely movable heat sealing and pressure means as it appears when completely closed about an article to be wrapped, which article is not shown.

It has been discovered that a packaging apparatus which is capable of tightly wrapping and heat sealing a thermoplastic film about an article to be wrapped can be provided by means of a uniquely movable heat sealing and pressure means. In accordance with this invention, the movable heat sealing and pressure means travels through two downward arcs in the process of tightly wrapping the thermoplastic film about the article to be wrapped. It is preferred that the movable heat sealing and pressure means be U-shaped, though it is within the scope of this invention that it be some other shape such as an L-sealer. A U-shaped heat sealing and pressure means may be adapted to wrapping articles of various sizes by designing the side jaws to be adjustable, e.g., the front jaw or base of the U-shaped member can be slotted with the side jaws movably fitting into the slots in the front jaw.

In accordance with this invention, the front jaw of the uniquely movable heat sealing and pressure means travels through a first downward arc toward the article to be wrapped in such a manner as to provide a relatively tight wrap about the article in one direction. Thereafter with the front jaw anchored in the work table holding the article to be wrapped, the movable heat sealing and pressure means travels through a second downward arc, i.e., the side jaws travel the second downward arc so as to tightly wrap the thermoplastic film about the article in the other direction.

After the thermoplastic film has been tightly wrapped about the article to be wrapped, the next step in the packaging process is to heat seal the thermoplastic film in place about the article. The heat sealing is accomplished by means of heating element wires which may be activated by an electrical impulse in a conventional manner. Heating element wires are placed on the work table so as to coincide with the side edges of the article to be wrapped and in alignment with the jaws of the movable heat sealing and pressure means. The thermoplastic film is compressed between the movable jaws and the heating element wires. As shown in FIGURE 1, the movable front jaw has a heating element attached to it which permits more uniform heating of the wires for the front heating element is insulated from the side heating elements by the thermoplastic film which is interposed. If desired, the front heating element may also be placed in the work table in which case it is preferred that it not extend across the side heating elements so as to ensure the uniform heating of the heating elements. In addition, it should be noted that the side heating elements are adjustable in the same manner as the adjustable side jaws of the movable heat sealing and pressure means in order to maintain them in alignment. The heating elements are held at their ends under spring tension so as to take up the slack caused by the heating of the elements. The heating elements are electrically insulated from the work table and the movable jaws such as by strips of polytetrafluoroethylene or silicone rubber.

The heating elements are heated in a conventional manner by an electrical impulse system. This system may be either manually operated or it may be automatic, e.g., the electrical impulse may be initiated by a dual microswitch which triggers a relay switch which is in series with the heating elements and simultaneously starts an adjustable timing switch which terminates the action of the relay switch and thus terminates the electrical pulse. The switching mechanism may be designed so that the movable jaws must be opened and then pressed shut again before a new pulse can be actuated. The electrical impulse should provide for varying both the strength and the duration of the electrical impulse. It has been found that the strength and duration of the impulse for obtaining good heat seals will vary with the thickness and type of thermoplastic film, e.g., polypropylene, polyvinylchloride, polyethylene and polyesters films may be used for packaging with the apparatus of this invention. If desired for certain applications, continuous heating elements may be used, though an electric impulse system is generally preferred.

The thermoplastic film may be delivered to the packaging apparatus by either a one roll or a two roll system. Both systems create a curtain of film against which the article to be wrapped is pushed when placing it in the wrapping position. The one roll system may be designed to have a set of nip rolls which catch the edge of the film and which may turn a slight distance after each seal in order to provide fresh film for each package. The two roll system maintains a curtain of film by virtue of the sealing of a package uniting the two webs of film into a continuous film curtain which forms the seal at the back edge of the following package.

It should be noted that the heating elements are located either on the work table or on the bottom of the jaws of the movable heat sealing and pressure means. This feature of the invention provides for placing the heat seal at the bottom edge of the article to be wrapped. This enables any printed matter on the sides of the article to be clearly visible.

In the operation of a thermoplastic film packaging apparatus made in accordance with this invention, undesirable flaps of the thermoplastic film may be formed at the back ends of the article being wrapped. Flap formation is easily prevented by providing rear folding elements on the side jaws of the movable heat sealing and pressure means. These folding elements hang below the side jaws and are adjustably located on the side jaws so as to be able to contact the thermoplastic film at the back edge of the article to be wrapped. As the side jaws are lowered, the folding elements come into contact with the work table whereupon further lowering of the side jaws causes the folding elements to slide forward into contact with the film. Upon lowering the side jaws even further, the folding elements close or fold the film against the side edge of the article to be wrapped, upon which it is heat sealed.

A more detailed description of a preferred embodiment of this invention may be had by referring to the drawings in which FIGURE 1 is a side elevation view of a thermoplastic film packaging apparatus made in accordance with this invention. In FIGURE 1, the thermoplastic film packaging apparatus 10 is wrapping thermoplastic film supplied by two rolls of film 11 and 12 about an article to be wrapped 13. The rolls of thermoplastic film are supported on pairs of rollers 14 and 15 to facilitate the unrolling of the film. If desired, the rollers can be powered to unwind automatically. The rollers 14 are attached to and supported by the posts 24 and 25. The film passes over rollers 16 which protect it from the front edge of the work table 17. The film passes over rollers 18 and 19 which protect it from the front jaw 20 of the uniquely movable heat sealing and pressure means 21. In this manner the thermoplastic film forms a curtain in front of the work table 17 into which the article to be wrapped 13 is advanced to its position on the work table 17. The film passes over, under and along the back end of the article 13 which is advanced along the work table 17 until it meets the adjustable article holder 22. The adjustable holder 22 locates the article 13 in the proper position on the work table 17. The adjustable holder 22 has a resilient material 23 attached to its front which contacts the film wrapped around the back end of the article 13. The resilient material 23 is compressible and may be sponge rubber.

The uniquely movable heat sealing and pressure means 21 is a principal feature of this invention. The U-shaped pressure means 21 illustrated in FIGURES 1 and 2 comprises two side jaws 26 and 27 and a front jaw 20. The front jaw 20 is slotted so that the side jaws 26 and 27 can be adjusted according to the size of the package. Attached to the front edge and corners of the front jaw are two anchors such as 28 which anchor the movable heat sealing and pressure means 21 to the work table 17 by means of sockets 29 and 30 provided therein. On the underside of the front jaw 20 there is a strip of insulating material 31, such as silicone rubber or polytetrafluoroethylene, separating the jaw and the heating wire 32. The heating wire 32 provides the heat seal along the front edge of the article 13, and instead of being attached to the front jaw 20, it may be located on the work table 17.

The side jaw 26 has a slot 33 which provides means for adjusting the rear folding element 34 weighted at 35 to maintain it in the proper position. As previously described, the folding element 34 functions to fold the film against the article 13 to prevent the formation of flaps of thermoplastic film. Attached to the top of side jaw 26 is a clamp 36 which contacts the folding element 34 and holds it in position when the movable heat sealing and pressure means 21 is raised. Side jaw 27 is also equipped with a weighted folding element 37 and a clamp 38. Clamp 38 is adjustably mounted so that it may be moved along slot 38a as the folding element 37 is moved. Clamp 36 is adjustably mounted in like manner.

The removable heat sealing and pressure means 21 is attached to horizontal support bars 39 and 40 by means of rocker arms 41 and 42 firmly attached to the side jaws 26 and 27 and rotatably attached to a rocker rod pivot 43. The rocker rod pivot 43 is firmly attached to the horizontal support bars 39 and 40, and in like manner, down draw bar 44 is firmly attached to the front of the horizontal support bars 39 and 40. The bar 44 is grasped and pulled down by the operator. The horizontal support bar 39 is attached to a spring 45 at its back end and in like manner the horizontal support bar 40 is attached to a spring. These springs return the horizontal support bars 39 and 40 and consequently the heat sealing and pressure means 21 to their open position after the heat sealing operation has been completed.

The horizontal support bars 39 and 40 are rotatably attached to vertical support posts 46 and 47. These vertical support posts 46 and 47 are hinged to the work table 17 as shown by hinge pivot 48 and are also attached to springs such as spring 49. As the down draw bar 44 is pulled down, the heat sealing and pressure means travels a downward arc until the front jaw 20 contacts the article 13 as shown by the arrow 50. The means 21 continues downward tightly wrapping the film about article 13 until the anchors such as 28 are positioned in sockets 29 and 30 as shown by arrow 51.

As clearly shown in FIGURES 2 and 3, heat wires 52 and 53 are located on the work table 17 for heat sealing the thermoplastic film. These wires are connected to a variable source of electricity. The heat wires 52 and 53 may be insulated from the work table 17 by strips of insulating material 54 and 55. The heat wires 52 and 53 may be adjusted according to the size of the article being wrapped by means of slots 56, 57, 58 and 59 in the work table 17. Slot 60 in the work table 17 enables the holder 22 to be adjusted according to the size of the article being wrapped. As shown in FIGURE 3, a strip of insulating material 61 may be placed on the work table 17 at the position where it is contacted by the front jaw 20. In like manner, compressible insulating material may be placed along the bottom of the side jaws 26 and 27.

As shown in FIGURE 2, there is a torsion spring 61 firmly attached to the rocker arm 42 and the rocker rod pivot 43. The torsion spring 61 is adjustably mounted to the rod 43 by means of a fitting 62 and screw 63. In like manner there is a torsion spring attached to rocker arm 41. These torsion springs function to return the movable heat sealing and pressure means 21 to its proper open position.

FIGURES 4 to 6 are schematic illustrations of the uniquely movable heat sealing and pressure means 21 particularly illustrating its double arcing motion by which it achieves a tight wrap of the thermoplastic film about an article to be wrapped. FIGURE 4 illustrates the movable pressure means 21 in the open position similar to that shown in FIGURE 1. In this position, the apparatus is ready to receive an article to be wrapped.

The down draw bar 44 is grasped by the operator and pulled downward causing the movable pressure means 21 to transcribe a first downward arc as shown by arrows 51 and 65 until the anchor 28 is in the socket 29. This causes the spring 45 to be extended as shown in FIGURE 4. After the front jaw 20 of the movable pressure means 21 has been anchored to the work table 17, the movable pressure means transcribes a second downward arc as shown by arrow 66 in FIGURE 6. During this second arc, there is a slight forward moment which causes the article to be wrapped to be compressed against the article holder and it also causes the vertical support post 46 to be pushed away from the work table (see arrow 67 through one of the movable pivots in FIGURE 6). This is the reason for hinging the post 46 to the work table 17 at fixed pivot 48. It should be noted that the spring 45 is further extended and the spring 49 is also extended. FIGURE 6 also shows how the rear folding element 34 has been displaced.

It will be apparent to those skilled in the thermoplastic film packaging art that the apparatus of this invention is useful for wrapping with both heat shrinkable and non-heat shrinkable thermoplastic films. The tight wrap provided by this apparatus is useful in reducing the amount of heat shrinking necessary to get an extra tight wrap with heat shrinkable film. In addition, it will be apparent to those skilled in the art that this apparatus can readily be made to be semi-automatic or automatic.

Having completely described this invention, what is claimed is:

1. A thermoplastic film packaging apparatus comprising a work table having a plurality of adjustable heating elements located thereon and a movable heat sealing and pressure means, means mounting said movable heat sealing and pressure means above said work table, said mounting means comprising a fixed pivot and two movable pivots whereby said movable heat sealing and pressure means travels through a dual arcing path when being lowered into contact with said heating elements.

2. A thermoplastic film packaging apparatus comprising a work table having two substantially parallel, adjustable heating elements located thereon, a U-shaped, movable heat sealing and pressure means having two adjustable side jaws and a front jaw, a heating element attached to the underside of said front jaw, means mounting said movable heat sealing and pressure means above said work table in such a manner that it can be lowered so that the two side jaws contact said adjustable heating elements, said mounting means comprising a fixed pivot and two movable pivots whereby said movable heat sealing and pressure means travels through a dual arcing path when being lowered into contact with said heating elements, the first arcing path being terminated when said front jaw contacts said work table and the second arcing path being terminated when said side jaws are closed upon said adjustable heating elements.

3. An apparatus in accordance with claim 2 in which there are two anchors firmly attached to the front bottom corners of said front jaw and designed so as to fit into two sockets located in said work table when said front jaw is brought into contact with said work table.

4. An apparatus in accordance with claim 3 in which there are two adjustable rear folding elements movably attached to the outer side of said side jaws.

5. An apparatus in accordance with claim 4 in which there are spring means to return said movable heat sealing and pressure means and said rear folding elements to their original position after lowering them into contact with the work table.

6. An apparatus in accordance with claim 5 in which there is an adjustable article holder located on said work table.

References Cited by the Examiner

UNITED STATES PATENTS

| 3,047,991 | 8/1962 | Siegel et al. | 53—182 |
| 3,067,553 | 12/1962 | Rivman et al. | 53—390 X |
| 3,098,916 | 7/1963 | Souligney | 53—39 |
| 3,172,246 | 3/1965 | Ruff | 53—182 X |

TRAVIS S. McGEHEE, *Primary Examiner.*